United States Patent [19]
Neal et al.

[11] Patent Number: 5,512,344
[45] Date of Patent: Apr. 30, 1996

[54] OPHTHALMIC LENS MANUFACTURE

[75] Inventors: George H. Neal, Lake Ozark; William C. Kelley, Eldon, both of Mo.

[73] Assignee: Sola International Holdings Ltd., Lonsdale, Australia

[21] Appl. No.: 133,579

[22] Filed: Oct. 8, 1993

[30] Foreign Application Priority Data

Oct. 9, 1992 [GB] United Kingdom ............... 9221312

[51] Int. Cl.⁶ ......................................... C03B 23/22
[52] U.S. Cl. ............... 428/64.1; 351/163; 351/164; 351/168; 351/172; 359/462; 428/156; 428/161; 428/212; 428/213; 428/215; 428/220; 428/426
[58] Field of Search ............... 428/65, 212, 213, 428/215, 220, 156, 161, 426, 64.1; 351/164, 163, 168, 172; 359/462

[56] References Cited

U.S. PATENT DOCUMENTS

| | | | |
|---|---|---|---|
| 1,957,117 | 5/1934 | Tillyer | 351/172 |
| 2,885,829 | 5/1959 | Emerson | 65/38 |
| 2,923,201 | 2/1960 | Beasley | 351/172 |
| 2,963,823 | 12/1960 | Ohliger | 65/38 |
| 3,649,236 | 3/1972 | Rosenbauer | 351/168 |
| 3,975,093 | 8/1976 | Upton | 351/164 |
| 4,992,086 | 2/1991 | Buckley | 65/38 |

FOREIGN PATENT DOCUMENTS 1139943  11/1962  Germany.

Primary Examiner—Nasser Ahmad
Attorney, Agent, or Firm—Burns, Doane, Swecker & Mathis

[57] ABSTRACT

A button for forming a segment of a multifocal lens the button comprising a first portion composed of a lead oxide-containing glass, a second portion composed of a glass which contains substantially no lead oxide, the first and second portions being adjacent and forming a face of button for machining to a desired shape, and a third portion composed of a glass which contains substantially no lead oxide, the first and second glass portions being fused the third glass portion on a side of the first and second portions remote from the said face of the button. The invention also provides a method of making a multifocal lens by (a) providing a button in accordance with the invention, (b) machining the said face of the button to the desired shape to match a recess in a lens blank; (c) disposing the button in the recess with the machined face adjacent to the face of the recess; (d) fusing the button in the recess; and (e) removing by grinding the third portion, and unwanted regions of the first and second portions so as to form a desired lens surface.

12 Claims, 1 Drawing Sheet

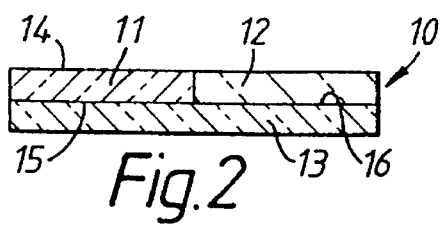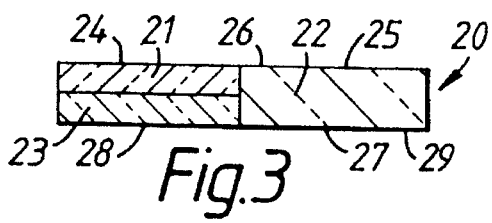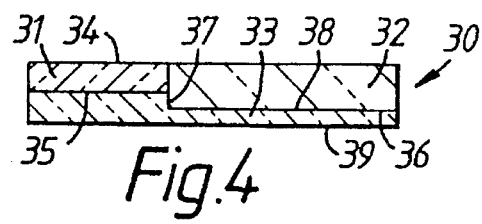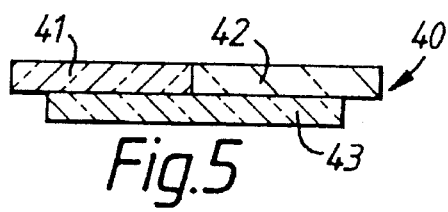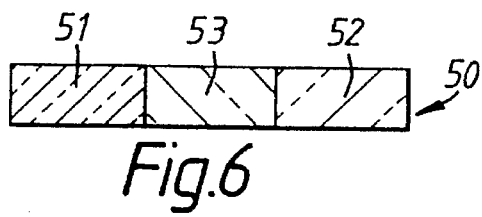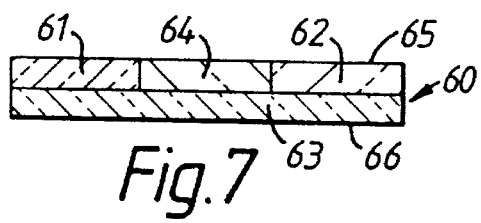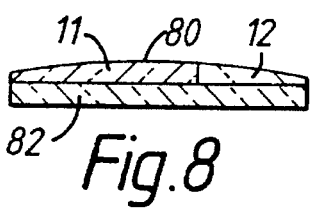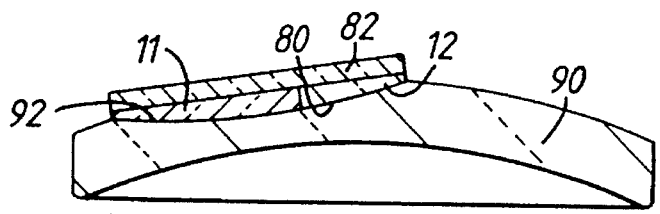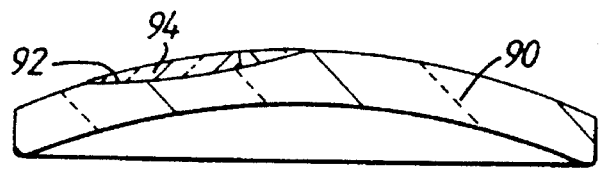

OPHTHALMIC LENS MANUFACTURE

BACKGROUND OF THE INVENTION

This invention relates to the manufacture of an ophthalmic lens and more particularly it relates to a method of manufacturing multifocal lens blanks containing a segment made of a lead oxide-containing glass and to a button for forming such a segment.

DESCRIPTION OF THE PRIOR ART

In the manufacture of multifocal lens blanks, a conventional glass blank made of a white or photochromic glass is machined to form a recess at a position where s segment of different power is needed in the lens e.g. for reading. A glass body, known in the art as a "button", to form the segment which is shaped to fit the recess and having a portion protruding therefrom is then fused into the recess by holding the blank and button assembly at a temperature near the softening point of the glass until such fusion has taken place.

FIG. 1 shows a conventional button before shaping to fit a recess in a blank for a multifocal lens. The button comprises a first glass portion 1 containing lead oxide and a second glass portion 2 of the same composition as the blank to which the button is being fused, for example a white crown or photochromic glass. These conventional buttons are typically manufactured to a thickness of 5.5 to 6.0 mm.

The button must have a thickness to make it handleable during processing and to provide sufficient weight for the button to fuse satisfactorily during the heating step. After the completion of the fusion process, the portion of the button which protrudes proud of the blank surface must be ground to remove any discontinuity between the surface of blank and segment, and the resulting surface polished. Such an operation when the button is wholly or partially formed from a lead oxide-containing glass will result in the production of a lead oxide-containing slurry from the unwanted parts of the lead oxide-containing glass. Such a slurry must be filtered and the solids collected and sent to a lead smelter for special processing so as to avoid contamination of the environment. This is expensive and inconvenient.

Normally during these operations 85 to 95% of a typical button is ground away and because of the nature of the process, it is not possible to simply reduce the size of the button. The parts of the button are made by a simple pressing process and in order to avoid warping must be made to a minimum thickness.

SUMMARY OF THE INVENTION

The present invention aims to reduce the lead oxide content in a glass button for a multifocal lens.

The present invention provides a button for forming a segment of a multifocal lens, the button comprising a first portion composed of a lead oxide-containing glass, a second portion composed of a glass which contains substantially no lead oxide, the first and second portions being adjacent and forming a face of the button for machining to a desired shape, and a third portion composed of a glass which contains substantially no lead oxide, the first and second glass portions being fused to the third glass portion on a side of the first and second portions remote from the said face of the button.

The present invention further provides a method of making a multifocal lens, the method comprising: (a) providing a button according to the present invention; (b) machining the said face of the button to the desired shape to match a recess in a lens blank; (c) disposing the button in the recess with the machined face adjacent to the face of the recess; (d) fusing the button in the recess; and (e) removing by grinding the third portion, and unwanted regions of the first and second portions, so as to form a desired lens surface.

The present invention still further provides a method of reducing the quantity of lead oxide containing slurry produced during the formation of a multifocal lens blank of the kind having a segment formed by fusing a glass button into a recess formed in the blank, and then removing any un-needed glass in which the segment is formed wholly or partially of a lead oxide containing glass, by forming the button with a lead oxide containing glass portion with a thickness about one half or less than that conventionally used, and ensuring the button has the necessary thickness to enable it to be used satisfactorily by fusing the lead oxide containing glass portion to a non-lead oxide containing glass portion, said non-lead oxide containing glass portion being positioned in the button so as to be removed completely after completion of the fusion process.

The present invention is based on forming the button as a composite in which the lead oxide-containing glass part is reduced in thickness, preferably to the minimum compatible with the moulding process by which such parts are made, and the necessary thickness and weight is achieved by providing an additional glass part which is wholly machined away after fusion.

BRIEF DESCRIPTION OF THE DRAWINGS

Embodiments of the present invention will now be described by way of example only with reference to the accompanying drawings in which:

FIG. 1 shows a vertical cross-section through construction of a conventional button for a bifocal lens;

FIGS. 2 to 5 are vertical cross-sections through buttons for bifocal lenses in accordance with first to fourth embodiments of the present invention;

FIG. 6 is a vertical cross-section through construction of a conventional button for a trifocal lens;

FIG. 7 is a vertical cross-section through a button for a trifocal lens in accordance with a fifth embodiment of the present invention;

FIGS. 8 to 10 are vertical cross-sections which show the manufacture of a bifocal lens in accordance with a further embodiment of the method of the present invention the conversion of the button shown in FIG. 2 from its initial form to being fused into a recess in a lens blank and subsequently ground to form the lens.

DETAILED DESCRIPTION OF THE PREFERRED EMBODIMENTS

FIG. 2 shows a button 10 according to a first embodiment of the invention comprising a first glass portion 11 composed of a lead oxide-containing glass and a second glass portion 12 adjacent and fused thereto composed of a glass of the same composition as the blank to which the button is to be fused, e.g. a white crown or a photochromic glass. The first and second glass portions 11 and 12 each have a rectangular vertical cross-section and have the same vertical thickness so that when they are horizontally adjacent as shown in FIG. 2 they form opposed planar upper and lower faces 14,15. The first and second glass portions 11 and 12 each have substantially the same shape and configuration as the corresponding portions 1 and 2 of the conventional button shown in FIG. 1 except that their thickness has been reduced by about one half or more of the conventional thickness, typically to a thickness of from 3.0 to 3.5 mm.

The first and second portions 11,12 are both fused by their common lower face 15 to a third glass portion 13 of thickness typically 2.0–3.0 mm. The third glass portion 13 is composed of a glass which does not contain lead oxide. As will be described hereinbelow, in the manufacture of e multifocal lens the third glass portion 13 is removed completely by grinding. The third glass portion 13 has 8 rectangular vertical cross-section and has an upper face 16 which is fused to and substantially co-extensive with the lower face 15 of the fused first and second glass portions 11,12. Manufacturing a button in this way provides a button which is comparable in thickness, i.e. from 5.5 to 6.0 mm thick, and weight to the conventional button shown in FIG. 1.

FIG. 3 shows a button 20 in accordance with the second embodiment of the present invention which is a modification of the button shown in FIG. 2. In this embodiment, the first glass portion 21 containing lead oxide is reduced in thickness as compared to the conventional button shown in FIG. 1 and has substantially the same shape and dimensions as the first glass portion of the first embodiment. The second glass portion 22 has a thickness substantially the same as the second glass portion in the conventional button of FIG. 1 and the third glass portion 23 is correspondingly reduced in its horizontal dimensions so as to be disposed only under the first glass portion 21. Thus in the button 20 of the second embodiment, the upper face 24 of the first glass portion 21 and the upper face 25 Of the second glass portion 22 form a common upper face 26 of the button 20 and the lower face 27 of the second glass portion 22 and the lower face 28 of the third glass portion 23 form a common lower face 29 of the button 20.

FIG. 4 shows a button 30 in accordance with a third embodiment of the present invention which is a further modification of the button of the first embodiment. In this embodiment, the first glass portion 31 has substantially the same shape, configuration and thickness as the first portion of the first embodiment, except that, as is possible for each of the embodiments, the horizontal extent of the first glass portion 31 is varied depending on the ultimate requirements of the bifocal lens, and in FIG. 4 the first glass portion 31 is lesser in horizontal extent than in the first embodiment of FIG. 2. The second glass portion 32 which is adjacent to the first glass portion 31 has a thickness (which may be the same as that of the second glass portion of the conventional button) greater than that of the first glass portion 31. The upper face 34 of the button 30 is a common plane face of the first and second portions 31,32. The lower faces 35,36 respectively of the first and second glass portions 31,32 form a step 37 at the juncture between the first and second glass portions 31,32 and the upper face 38 of the third glass portion 33 is correspondingly stepped. The lower face 39 of the button 30 comprises the lower face of the third glass portion 33.

FIG. 5 shows a button 40 in accordance with a fourth embodiment of the present invention which has a similar configuration of first and second glass portions 41,42 as the corresponding first and second portions of the first embodiment shown in FIG. 2. However, the third glass portion 43 has a lateral extent which is smaller than the combined lateral extent of the first and second glass portions 41,42 so that the third glass portion 43 does not conform in shape to the combined assembly of first and second glass portions 41,42.

In each of the embodiments of the present invention, the first glass portion which is composed of a lead oxide-containing glass has a thickness which is substantially less, i.e. about one half or less in thickness, than the thickness of the corresponding portion employed in the button of the prior art and is typically from 3.0 to 3.5 mm thick, with the remainder of the button being composed of the second and third glass portions which do not contain lead oxide. The total thickness of each of the buttons in accordance with the embodiments of the present invention is substantially the same as the total thickness of the button of the prior art, i.e. from 5.5 to 6.0 mm thick.

The embodiments of FIGS. 2 to 5 show buttons which can be used for forming bifocal lenses. However, other multifocal lenses such as trifocal lenses can be provided by incorporating an additional component.

FIG. 6 shows a conventional trifocal button 50 comprising a series of three glass regions, namely, a first glass region 51 composed of lead oxide-containing glass, a second glass region 52 composed of a glass of the same composition as the blank to which the button 50 is to be fused, e.g. a white crown or photochromic glass, and a further glass region 53 sandwiched between the first and second glass regions 51,52. The further glass region 53 is a trifocal region which may be composed of a glass containing lead oxide or of a glass of the same composition as the blank to which the button 50 is to be fused.

In accordance with further embodiments of the present invention a trifocal button can be formed by disposing first and second glass portions comprising respectively lead oxide-containing glass in the first portion (which may comprise the first region or the first and trifocal regions) and lead oxide-free glass in the second portion (which may comprise the second and trifocal regions or the second region) on a third glass portion in the various constructions shown in FIGS. 2 to 5. If the trifocal region is made of a glass containing lead oxide, this can be reduced in thickness together with the first glass region in the same manner as the first glass portion in the button constructions shown in FIGS. 2 to 5. If the trifocal region is not made of a glass containing lead oxide, the button can be formed by providing the trifocal region with the same construction as the second glass portion shown in the embodiments of FIGS. 2 to 5.

An example of such an embodiment of a trifocal button 60 formed in accordance with the present invention is illustrated in FIG. 7 in which an assembly of a first glass region 61 composed of a lead oxide-containing glass and a second glass region 62 composed of a glass of the same composition as the blank to which the button is to be fused has sandwiched and fused therebetween a trifocal glass region 64 of lead oxide-free glass, the regions having the same thickness which is around 3.0 to 3.5 mm. The three regions 61,62,64 comprising a first lead oxide-containing portion and a second lead oxide-free portion are fused to a third glass portion 63 of lead oxide-free glass which is substantially coextensive with the assembly of the first, second and trifocal regions 61,62,64. The upper face 65 of the button 65 comprises surface portions of the first, second and trifocal regions 61,62,64 and the lower face 66 of the button 60 comprises the lower face of the third glass portion 63.

FIGS. 8 to 10 illustrate a method of manufacturing a multifocal lens, in which, in this embodiment, the button 10 of the first embodiment illustrated in FIG. 2 is incorporated into a lens blank and then ground down to form the multifocal lens. Compared to the prior art, after the grinding away of the excess portions of the button 10 a reduction is achieved in the quantity of lead oxide-containing slurry which is produced in the grinding process.

FIG. 8 shows the button 10 of the embodiment of FIG. 2 after the upper face 14 has been machined to produce a curved surface 80 in the machined button 82, the machining removing parts of the first and second portions the button. FIG. 9 shows a lens blank 90 which has machined thereinto a recess 92 and the machined button 82 is disposed in the recess 92 with the machined surface 80 adjacent the face of the recess 92. The button 82 is then fused to the lens blank 90 in the conventional manner with the first and second glass portions 11,12 lying partially in the recess 92. After the fusing step, the excess material of the button is removed completely by grinding, the excess material comprising all of the third glass portion, and portions of the first and second glass portions 11,12 that the outer surface of the remainder of the button 82, comprised of the remaining parts of the first and second glass portions 11,12 which are retained in the recess has the appropriate shape. The grinding produces a slurry which contains lead oxide from the removed unwanted part of the first portion. FIG. 10 shows the finished multifocal lens blank with the unwanted material of the button ground off and a segment 94 in the recess 92. It can be seen that if the button had been of the construction shown in FIG. 1 with a thick lead oxide containing portion, there would have been a major increase in the amount of lead oxide-containing slurry produced during the processing.

In accordance with the preferred embodiments of the invention, the present inventors have found that the quantity of lead oxide containing slurry produced during manufacture of the lens can be reduced to 40 to 50% of that produced with conventional buttons, this being achieved by forming a more complex button than the prior art construction. The additional costs incurred in forming this more complex button are balanced to a substantial extent by the reduction in the costs of disposing of the lead oxide slurry.

What is claimed is:

1. A button for forming a segment to be disposed in a recess in multifocal lens, the button comprising a first portion composed of a lead oxide-containing glass, a second portion composed of a glass which contains substantially no lead oxide, the first and second portions being in adjacent contact and forming a face of the button for machining to a desired shape to match the recess in the lens, and a third portion composed of a glass which contains substantially no lead oxide, the first and second glass portions being fused to the third glass portion on a side of the first and second portions remote from the face of the button.

2. A button according to claim 1 wherein the first portion has a thickness of from 3.0 to 3.5 mm.

3. A button according to claim 1 wherein the button has a total thickness of from 5.5 to 6.0 mm.

4. A button according to claim 1 wherein the third portion is coextensive with the first and second portions.

5. A button according to claim 4 wherein the first and second portions have substantially the same thickness.

6. A button according to claim 4 wherein the second portion has a greater thickness than the first portion and the third portion has a step in the face thereof which is fused to the first and second portions.

7. A button according to claim 4 wherein the total thickness of the first and third portions is substantially the same as the thickness of the second portion.

8. A button according to claim 1 wherein the first and second portions have substantially the same thickness and the third portion has a smaller lateral extent than the assembly of the first and second portions.

9. A button according to claim 1 wherein the button is for bifocal lens.

10. A button according to claim 1 wherein the button is for a trifocal lens and the first or second portion comprises two parts each of which is to form a respective focal region of the lens.

11. A button according to claim 1, wherein the third glass portion is substantially entirely discardable after the machined face is fused in the recess in the lens.

12. A button according to claim 1, wherein the face of the button is machined to match a recess in a lens blank and is disposed and fused in the recess with the third portion being disposed so that all of the third portion may be removed by grinding to form a desired lens surface.

* * * * *